United States Patent [19]
Johnson

[11] Patent Number: 5,534,736
[45] Date of Patent: Jul. 9, 1996

[54] STATOR FOR AN ELECTRIC VEHICLE AND METHOD FOR PRODUCING THE STATOR

[75] Inventor: J. Herbert Johnson, Tipp City, Ohio

[73] Assignee: A. O. Smith Corporation, Milwaukee, Wis.

[21] Appl. No.: 335,929

[22] Filed: Nov. 8, 1994

Related U.S. Application Data

[62] Division of Ser. No. 101,875, Aug. 4, 1993, Pat. No. 5,398,397.

[51] Int. Cl.⁶ .................................................. H02K 5/00
[52] U.S. Cl. ........................ 310/91; 310/83; 310/217; 310/254; 180/65.5
[58] Field of Search ........................ 310/91, 217, 254, 310/258, 89, 259, 75 R, 83; 180/65.5, 65.6, 65.7; 74/665 F, 421 A

[56] References Cited

U.S. PATENT DOCUMENTS

| | | | |
|---|---|---|---|
| 1,627,712 | 5/1927 | Schurch | 180/65.6 |
| 3,253,171 | 5/1966 | Storck | 310/217 |
| 3,463,950 | 8/1969 | Schadlich | 310/83 |
| 3,463,955 | 8/1969 | Scardina | 310/91 |
| 3,821,846 | 7/1974 | Pleiss, Jr. et al. | 29/596 |
| 4,115,915 | 9/1978 | Godfrey | 29/596 |
| 4,559,698 | 12/1985 | Bair et al. | 29/598 |
| 4,603,273 | 7/1986 | McDonald | 310/89 |
| 4,614,022 | 9/1986 | Bibby et al. | 29/596 |
| 4,619,040 | 10/1986 | Wang et al. | 29/596 |
| 4,638,199 | 1/1987 | Brem et al. | 310/91 |
| 4,795,932 | 1/1989 | Long | 310/154 |
| 4,801,831 | 1/1989 | Lewis | 310/91 |
| 4,837,471 | 6/1989 | Kostoss | 310/258 |
| 4,859,974 | 8/1989 | Kliman et al. | 335/229 |
| 4,972,113 | 11/1990 | Newberg | 310/217 |
| 5,034,643 | 7/1991 | Trian | 310/215 |
| 5,041,749 | 8/1991 | Gaser et al. | 310/156 |
| 5,113,103 | 5/1992 | Blum | 310/258 |
| 5,330,026 | 7/1994 | Hsu | 180/65.5 |
| 5,398,397 | 3/1995 | Johnson | 310/217 |

*Primary Examiner*—R. Skudy
*Attorney, Agent, or Firm*—David R. Price; James Earl Lowe, Jr.

[57] ABSTRACT

An electric vehicle comprising a body, an axle rotatably supported by the body, a rotor supported by the body for rotation about a longitudinal axis, a gearing assembly for selectively drivingly connecting the rotor to the axle, and a stator supported by the body. The stator includes a stator core which has a longitudinal opening housing the rotor and which has an outer surface. The outer surface includes upper and lower longitudinally extending recesses oppositely disposed relative to the axis. The stator also includes upper and lower cleats respectively mounted in the upper and lower recesses, the cleats and the longitudinal axis defining a common vertical plane.

5 Claims, 5 Drawing Sheets

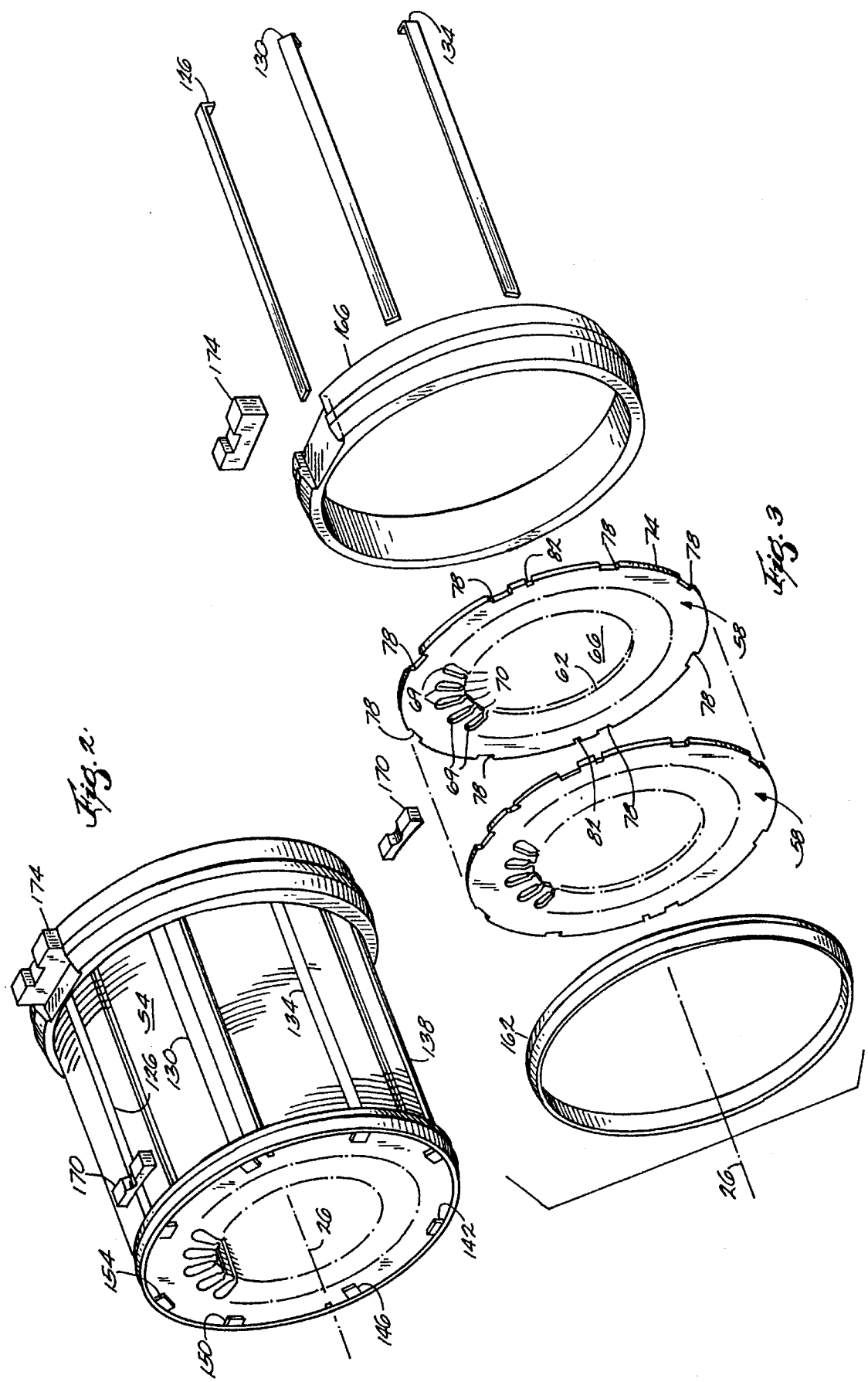

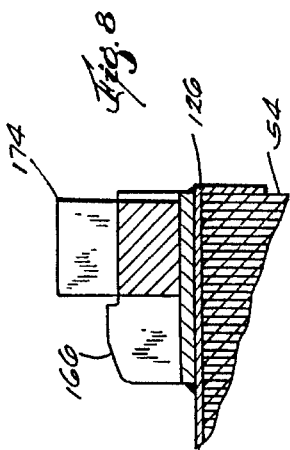
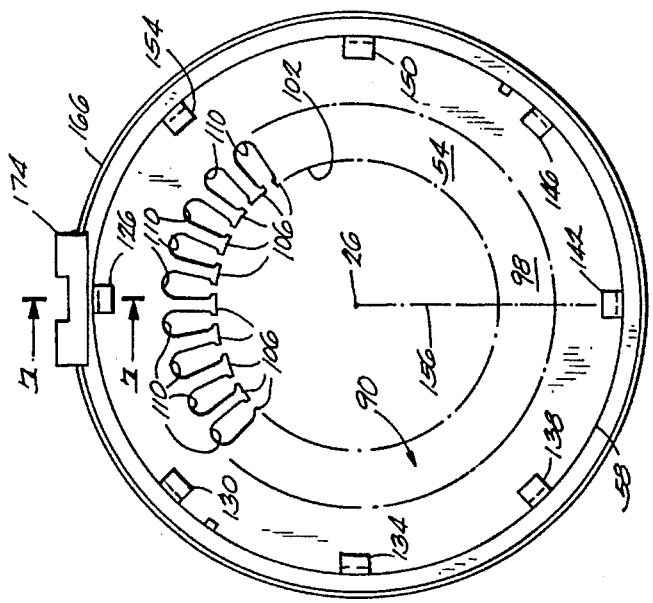
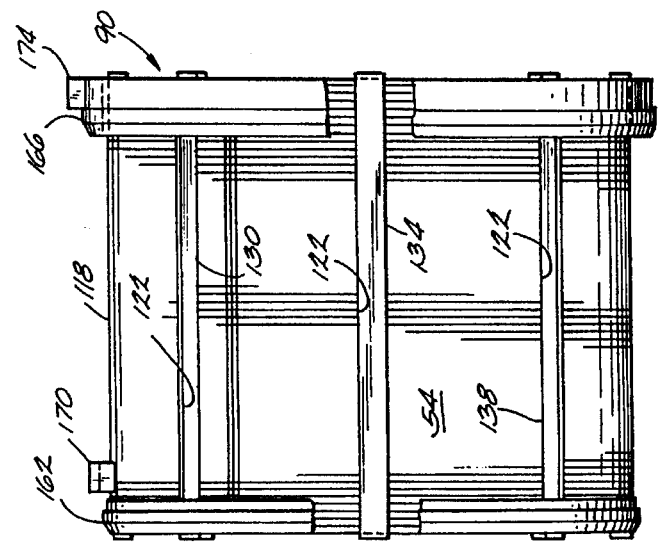
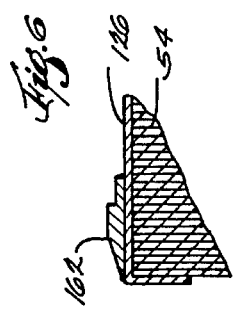
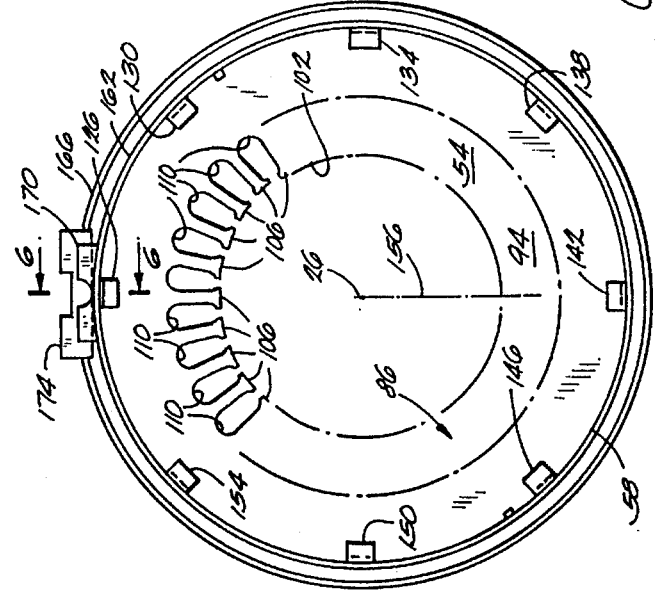

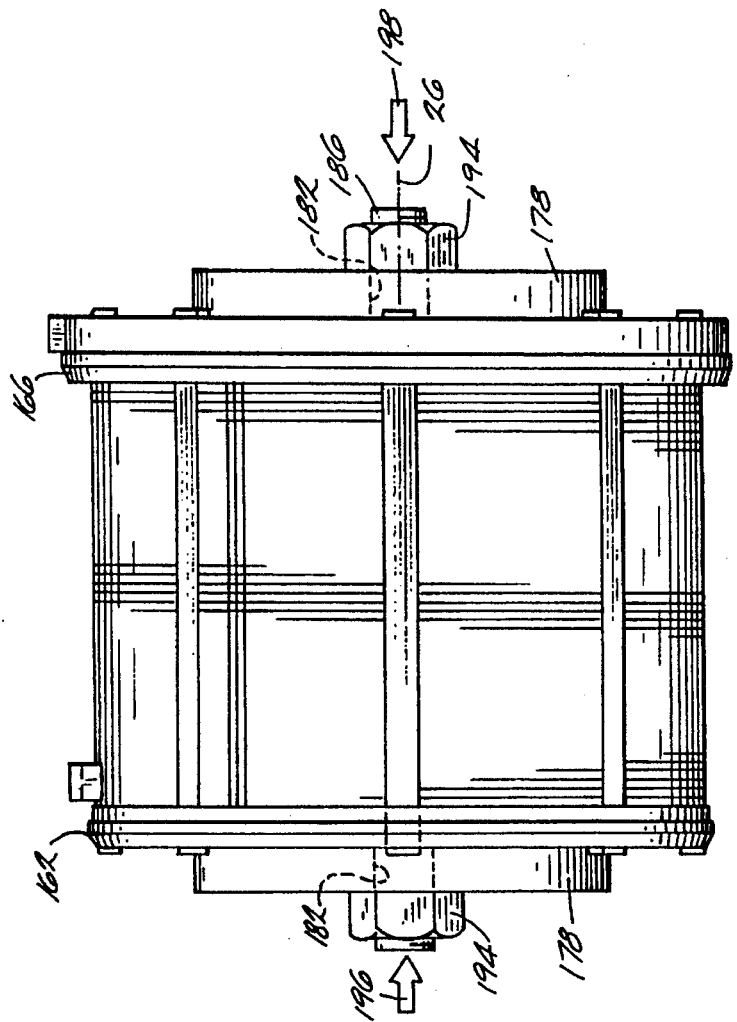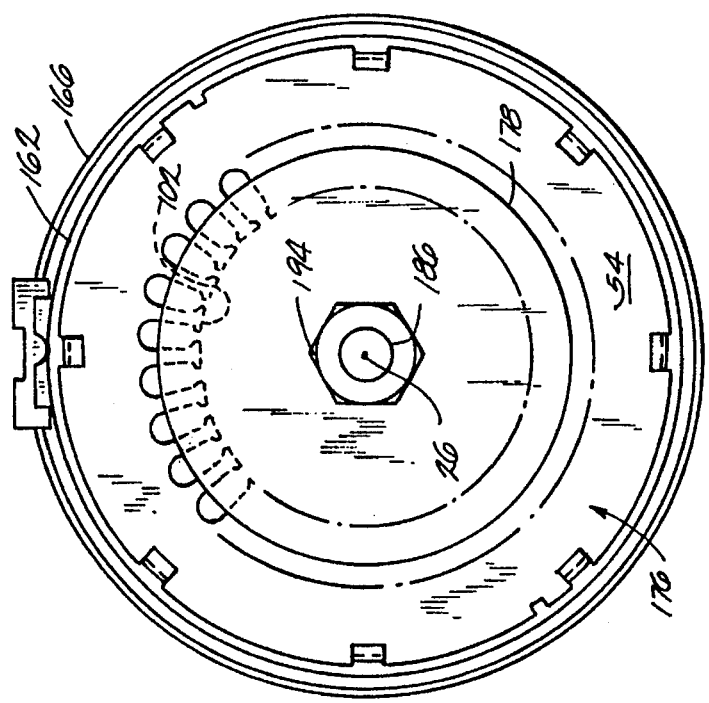

STATOR FOR AN ELECTRIC VEHICLE AND METHOD FOR PRODUCING THE STATOR

This is a divisional of application Ser. No. 08/101/875 filed on Aug. 8, 1993 now U.S. Pat. No. 5,398,397.

BACKGROUND OF THE INVENTION

The invention relates to a vehicle having an electric motor, and more particularly to a stator assembly for an electric vehicle.

It is known to provide, in an electric vehicle, a motor which includes a stator assembly having a stator core. Typically, the stator core comprises a series of annealed steel laminations or plates that are welded or riveted together. The stator core has therein a longitudinal bore (which houses a rotor) and typically includes at least two projections extending radially into the bore to support stator coils. It is also known to dip the stator assembly in bonding varnish, after the stator coils have been wound on the stator core, to secure the assembly together.

SUMMARY OF THE INVENTION

In an electric vehicle, the vehicle and motor can be subjected to severe vertical impact forces as the vehicle traverses rough terrain. These forces could cause the stator core to temporarily or permanently distort. If this occurs, the rotor could strike the stator and cause severe damage to the motor. Accordingly, it is desirable to provide a stator core assembly capable of withstanding the vertical impact forces to which it would be subjected in an electric vehicle. It is also desirable to provide a stator core which mechanically simulates a solid block of iron but which includes individual laminations.

Accordingly, the invention provides an electric vehicle including a body and an axle rotatably supported by the vehicle body. The axle is connected to a pair of wheels which rotate therewith and which support the vehicle on a given terrain. The vehicle includes a rotor supported by the vehicle body for rotation about a longitudinal axis. The rotor is drivingly connected to the axle, preferably by a transaxle gearing. The vehicle further includes a stator supported by the vehicle body. The stator includes a stator core which has a longitudinal opening receiving the rotor so that the rotor extends through the opening and can rotate freely therein. The stator core also includes an outer surface having upper and lower longitudinally extending recesses oppositely disposed relative to the longitudinal axis of the rotor. Upper and lower cleats are respectively mounted in the upper and lower recesses. Other cleats as necessary are similarly mounted in uniformly placed recesses around the periphery of the stator core. The stator is mounted on the vehicle body so that the upper and lower cleats and the longitudinal axis define a common vertical plane.

The invention also provides a method of producing a stator for an electric motor. The method includes the steps of (A) stacking stator laminations; (B) securing the laminations together to form a stator core assembly; (C) dipping the stator core assembly in bonding varnish to saturate the stator core assembly; (D) draining excess varnish from the stator core assembly after step (C); (E) clamping the stator core assembly together after step (D); (F) baking the clamped stator core assembly to cure the bonding varnish after step (E); and (G) winding the stator core assembly after step (F).

The invention also provides a method of manufacturing an electric vehicle in accordance with the foregoing.

A principal feature of the invention is the provision of a stator core having a pair of supporting cleats that are in a generally vertical plane with the longitudinal axis and that provide support to the stator core so that the stator core is capable of withstanding the severe vertical impact forces experienced by the vehicle.

Another advantage of the invention is the provision of stator core assembly that mechanically simulates a solid block of metal but includes individual laminations.

Another advantage of the invention is the provision of a method of producing a stator core, which method comprises the application of bonding varnish to the stator core after the stator core has been secured together, and clamping the stator core and keeping the core clamped while the bonding varnish is cured or polymerized during the baking operation, but before the stator core has been wound.

Other features and advantages of the invention will become apparent to those skilled in the art upon review of the following detailed description, claims and drawings.

DESCRIPTION OF THE DRAWINGS

FIG. 2 is a perspective view of the stator core prior to being wound.

FIG. 3 is an exploded partial view of the stator core.

FIG. 4 is a side elevational view of the stator core with portions cut away.

FIG. 5 is a left side elevational view of the stator core.

FIG. 6 is a view taken along line 6—6 in FIG. 5.

FIG. 7 is a right side elevational view of the stator core.

FIG. 8 is a view taken along line 8—8 in FIG. 7.

FIG. 9 is a left side elevational view of the stator core and a clamp assembly used during a baking process.

FIG. 10 is a side elevational view of the stator core and the clamp assembly.

Figure 11:
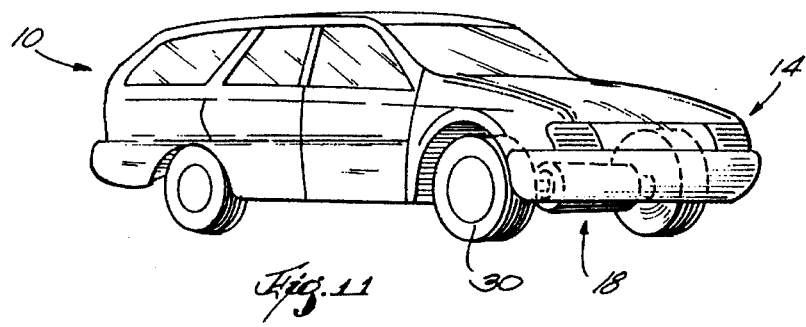
FIG. 11 is a perspective view of a vehicle embodying the invention and including a transaxle assembly.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Shown in FIG. 11 of the drawings is an electric vehicle 10 including a body 14. The vehicle body is conventional and forms no part of the invention. The vehicle body 14 supports a transaxle assembly 18. The transaxle assembly 18 includes (see FIG. 1) a frame 20 and an axle 22 which is supported by the frame 20 for rotation about a longitudinal axis 26. As is known in the art, the vehicle 10 also includes wheels 30 supported by the transaxle assembly 18 for rotation about the axis 26 in response to rotation of the axle 22. The transaxle assembly 18 also includes a hollow shaft 34 which is supported by the frame 20, which surrounds the axle 22 and which is supported for rotation about the axis 26 independent of the rotation of the axle 22. A rotor 38 is fixed to the shaft 34 for common rotation therewith. The rotor 38 is a conventional induction motor rotor and accordingly will not be described in greater detail.

The transaxle assembly 18 also includes a conventional planetary and differential gear arrangement 46. The transaxle gearing 46 drivingly connects the shaft 34 to the axle 22 so that rotation of the shaft 34 causes corresponding rotation of the axle 22 to drive the wheels 30 of the vehicle 10.

The transaxle assembly 18 also includes a stator 50. The stator 50 includes a generally cylindrical stator core 54 including stacked conductive steel stator laminations or plates. Only a single lamination or plate 58 (FIGS. 3, 5, and 7) will be described in detail.

As shown in FIG. 3, the lamination 58 includes a continuous inner edge 62 defining an opening 66. The inner edge 62 has therein spaced slots 69 defining therebetween a series of teeth 70. The lamination 58 also includes a generally circular, continuous outer edge 74. The outer edge 74 has therein eight notches 78 that are equally spaced around the edge 74. Preferably, the edge 74 also has therein two stacking slots 82 which are diametrically opposed to one another. The stacking slots 82 of the various laminations provide a means for aligning the laminations during stacking so as to match the contours of the inner and outer edges 62 and 74 of the individual laminations and form a stator core 54 in the shape of a cylinder.

The stator core 54 has (see FIGS. 4, 5 and 7) opposite ends 86 and 90 defined by respective end laminations 94 and 98. The aligned openings 66 define a longitudinal opening or bore 102 extending through the stator core 54. The bore 102 is centered on the axis 26. The rotor 38, the hollow shaft 34, and the axle 22 extend through the opening 102 in the stator core 54 and are capable of freely rotating about the longitudinal axis 26 within the opening 102.

Figure 1:
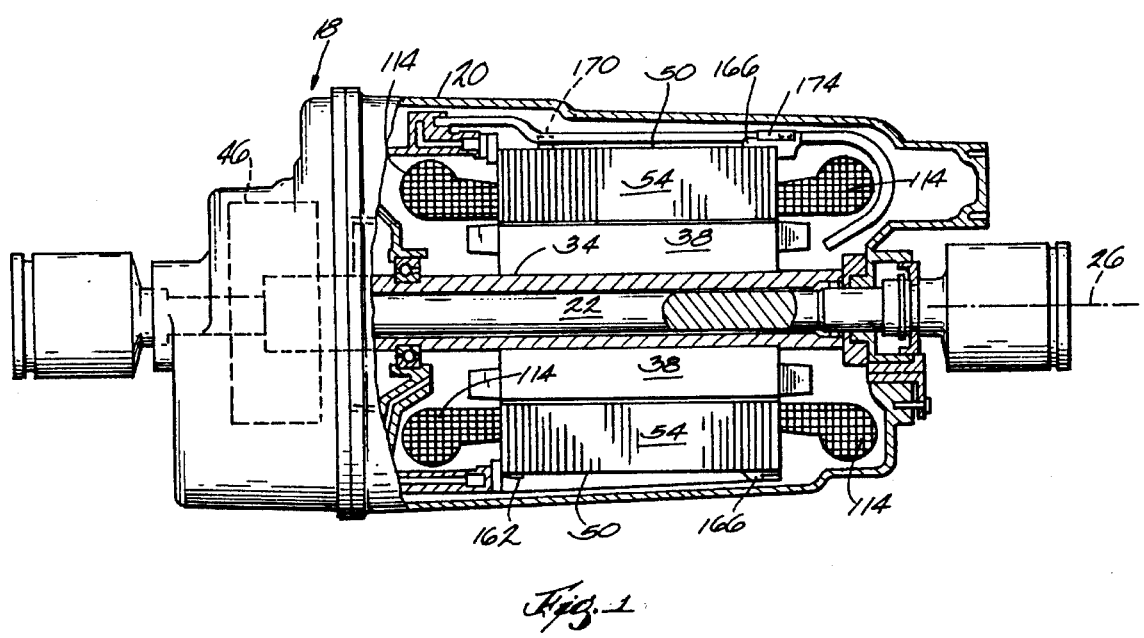
FIG. 1 is a partial cross-sectional view of the transaxle assembly which is shown in FIG. 11 and which includes a frame supporting an electric motor having a stator core.

The stator core 54 includes (see FIGS. 5 and 7) a series of longitudinal teeth 106 formed by the alignment of the teeth 70 on the individual laminations. The aligned slots 69 define a longitudinally extending slot 110 between each pair of teeth 106. As is known in the art, conductive wire having an insulated coating is wound around the teeth 106 to form stator windings 114 (FIG. 1).

The stator core 54 also includes (see FIG. 4) an outer surface 118 which has therein eight longitudinally extending recesses 122 (only three of which are shown in FIG. 4) formed by the aligned notches 78 on the outer edges 74 of the laminations. Any two oppositely disposed recesses 122 define a plane which includes the axis 26. Eight cleats 126, 130, 134, 138, 142, 146, 150, and 154 (FIGS. 3-5) are inserted and compressed in respective recesses 122. The cleats 126 and 142 and the axis 26 define a plane 156 (FIGS. 5 and 7). The cleats other than the cleats 126 and 142 are the additional cleats not in the vertical plane. As shown in FIGS. 4, 5 and 7, the ends of the cleats are bent over on the associated end laminations 94 and 98 to secure the stack of laminations together and provide mechanical rigidity to the stator core 54 prior to later welding and machining operations. It should be understood that fewer or more than eight cleats can be used as needed.

Figure 12:
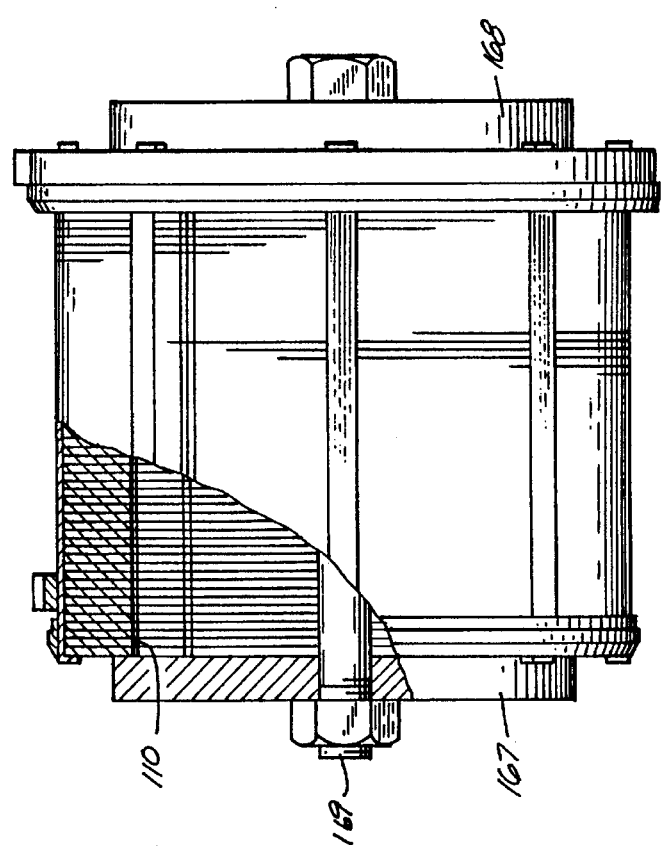
FIG. 12 is a side elevational view, partially broken away, of the stator core and a clamp assembly used while stator rings are being welded to the stator core.

The stator 50 also includes (see FIGS. 3 and 4) a pair of stator rings 162 and 166. The ring 162 is mounted on the outer surface 118 of the stator core 54 adjacent the end lamination 94, and the ring 166 is mounted on the outer surface 118 adjacent the end lamination 98. The rings 162 and 166 may be secured using any appropriate method. In the preferred embodiment, the stator rings are welded to the respective end laminations around the outer edges 74 thereof and are welded to the eight cleats. During this welding operation, the stator core 54 is preferably axially clamped by (see FIG. 12) a clamp assembly. The clamp assembly includes a pair of generally cylindrical, copper clamping plates 167 and 168. The clamping plate 167 is positioned adjacent end lamination 94 and the clamping plate 168 is positioned adjacent end lamination 98. The plates 167 and 168 are centered on the axis 26. Each plate has a central bore, and a threaded rod 169 extends through the plate bores and the bore 102. The radius of each plate is greater than the radius to the outermost portion of the slots 110. In other words, the plates 167 and 168 completely cover the ends of the slots 110. The plates 167 and 168 prevent weld spatter from entering the slots 110 and possibly causing failure of the stator winding, and the plates 167 and 168 also prevent the end laminations 94 and 98 from distorting while the rings 162 and 166 are welded to the core 54. The copper plates 167 and 168 also conduct heat away from the core 54.

The stator 50 also includes (see FIGS. 2–5) a tube support 170 which is welded to the cleat 126 adjacent ring 162. The stator further includes (see FIGS. 2–4, 7 and 8) a key block 174 which is welded to the ring 166 over the cleat 126 so that the tube support 170 and the key block 174 are in the plane 156 defined by cleats 126 and 142.

In the preferred embodiment, the stator core 54, including the cleats 126, et al., the stator rings 162 and 166, the tube support 170 and the key block 174, is coated and saturated with a bonding varnish such as, for example, epoxy. Preferably, this is accomplished by dipping the stator core 54 in the bonding varnish and allowing the bonding varnish to saturate the stator core 54.

After the stator core 54 has been saturated, the stator core 54 is removed from the bonding varnish and is axially clamped by a clamp assembly 176 to force excess varnish from between the laminations 58 and to tightly bond together the laminated teeth 106 near the bore 102 of the stator core 54. As shown in FIGS. 9 and 10, the clamp assembly 176 includes a pair of generally cylindrical clamping plates 178. One clamping plate 178 is positioned adjacent to end lamination 94 and the other clamping plate 178 is positioned adjacent to end lamination 98. The plates are centered on the axis 26. As shown in FIG. 9, the radius of each plate 178 is greater than the radius of the bore 102 and is less than the radius to the outermost portion of the slots 110. In other words, the plates 178 do not completely cover the ends of the slots 110. The radius of the clamping plates 178 is selected to allow drainage of bonding varnish from the bore 102 and from the slots 110 while the stator core is being clamped.

Each clamping plate 178 includes (see FIG. 10) a central bore 182. A threaded rod 186 extends through the bores 182 and the bore 102. Preferably, an eye hook (not shown) is located on at least one end of the threaded rod 186 to allow the clamped stator core 54 to be hung for draining and baking.

The clamp assembly 176 also includes a pair of nuts 194 for securing the plates 178 to the stator core 54. A nut 194 is threaded onto the threaded rod 186 adjacent each clamping plate 178. The nuts apply opposite axial forces to the clamping plates 178. The forces are directed toward one another as shown conceptually by arrows 196 and 198 in FIG. 10. The forces compress the stator core 54 along the longitudinal axis 26 and force the excess bonding varnish from the stator core 54.

When the excess bonding varnish has completely drained from the stator core 54, the stator core is baked to cure the bonding varnish. Such baking is known in the art and will not be described in greater detail. After baking, the stator core 54 is wound as described above to form the stator windings 114. The application of the Varnish after the stator core 54 has been secured together, but before it has been wound, improves the mechanical rigidity of the stator core 54 and the stator windings 114 and provides additional electrical insulation thereto. One or more varnishing and baking operations also follow the winding operation to further bond the windings and stator core.

The stator 50 is mounted on the transaxle assembly frame 20 as follows. As shown in FIG. 1, the rings 162 and 166 are connected to the transaxle assembly frame 20 to secure the stator 50 relative to the vehicle body 14. The tube support 170 and the key block 174 orient the stator 50 so that the plane 156 is vertical, and so that the cleats 126 and 142 can be considered upper and lower cleats, respectively.

In operation, electricity is transmitted to the windings 114 (FIG. 2 only) on the stator 50 to cause rotation of the rotor 38 as is commonly known in the art. Rotation of the rotor 38 causes corresponding rotation of the hollow shaft 34. Power is selectively transmitted from the hollow shaft 34 through the transaxle gearing 46 to the axle 22 to cause rotation of the axle 22 and corresponding rotation of the wheels 30 to drive the vehicle 10 in a desired direction, forward or reverse. As the vehicle 10 encounters bumps or pot-holes in the driving terrain, the resultant vertical impact forces are transmitted through the wheels 30 to the axle 22 and transaxle assembly 18. The increased mechanical rigidity provided by the generally vertical orientation of the cleats 126 and 142 and by the bonding process substantially prevents distortion of the stator core 54.

Figure 13:
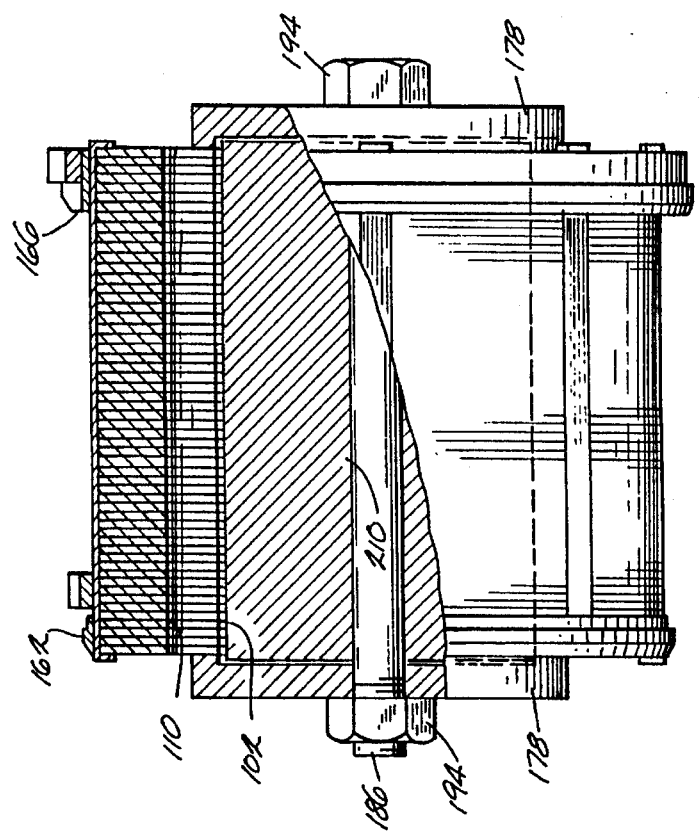
FIG. 13 is a view similar to FIG. 10 which is partially broken away and which shows an alternative method of clamping the stator core.

An alternative to the clamping arrangement shown in FIGS. 9 and 10 is shown in FIG. 13. Actually, the arrangement shown in FIG. 13 is identical to the other arrangement except for the addition of an aluminum tube 210 within the bore 102. The tube 210 has an outside diameter slightly less than the inside diameter of the bore 102. For example, the tube outside diameter can be 4.745 inches and the bore inside diameter 4.750. Because of the difference in thermal coefficient of expansion between steel and aluminum, the tube 210 will try to expand during the baking operation to an outside diameter greater than the inside diameter of the bore 102. The tube 210 will cause the stator teeth to move slightly inward and become better aligned, thereby eliminating the need to roller burnish the inside of the stator core 54. When the core 54 and the tube 210 are cooled after baking, the tube 210 will shrink to its original size and be easily removed from the bore 102. The core will have a smooth inside diameter and will not have smashed teeth that could be shorted together.

Various features of the invention are set forth in the following claims.

I claim:

1. An electric vehicle comprising:

a body;

an axle rotatably supported by said body;

a rotor supported by said body for rotation about a longitudinal axis;

a gearing assembly for selectively drivingly connecting said rotor to said axle; and a stator supported by said body, said stator including a stator core which has a longitudinal opening housing said rotor and which has an outer surface, said outer surface including upper and lower longitudinally extending recesses oppositely disposed relative to said axis, and said stator also including upper and lower cleats respectively mounted in said upper and lower longitudinally extending recesses, said cleats and said longitudinal axis defining a common vertical plane.

2. A vehicle as set forth in claim 1 and further comprising a transaxle assembly supported by said body, said transaxle assembly including said axle, and a hollow shaft surrounding said axle, wherein said rotor is fixed to said hollow shaft for common rotation therewith, and wherein said gearing assembly selectively drivingly connects said shaft to said axle.

3. A vehicle as set forth in claim 1 wherein said stator also includes stator rings secured to the outer surface of said stator core.

4. A vehicle as set forth in claim 1 wherein said outer surface includes additional longitudinally extending recesses, and wherein said stator also includes additional cleats, each of said additional cleats being mounted in a respective one of said additional recesses.

5. A vehicle as set forth in claim 1 and further comprising a pair of wheels mounted on opposite ends of said axle to propel said vehicle over terrain.

\* \* \* \* \*